C. WHITNEY.
CAKE BEATER.
APPLICATION FILED JUNE 23, 1913.

1,098,070.

Patented May 26, 1914.

UNITED STATES PATENT OFFICE.

CLAIRE WHITNEY, OF SAN FRANCISCO, CALIFORNIA, ASSIGNOR OF ONE-HALF TO EMILY J. SHIVELY, OF SAN FRANCISCO, CALIFORNIA.

CAKE-BEATER.

1,098,070. Specification of Letters Patent. Patented May 26, 1914.

Application filed June 23, 1913. Serial No. 775,384.

*To all whom it may concern:*

Be it known that I, CLAIRE WHITNEY, a citizen of the United States, residing at San Francisco, in the county of San Francisco and State of California, have invented certain new and useful Improvements in Cake-Beaters; and I do hereby declare the following to be a full, clear, and exact description of the invention, such as will enable others skilled in the art to which it appertains to make and use the same.

My invention consists in certain new and useful improvements in beaters or mixers for cake batter, dough and analogous pasty compounds and relates more particularly to means for manually grasping and operating the same.

In the use of the usual form of hand mixing spoons, beaters or the like, there is involved more or less painful fatigue of the arm, wrist and hand, much of which is due to the firm and continuous grip required for preventing axial rotation of the spoon or beater in the hand of the operator, and the object of my invention is to obviate all necessity for a heavy grip upon the device and to provide a means for manually holding and operating a beater or mixer, which contemplates using the open hand with the fingers in relaxed position. This construction also materially assists in manipulating the device deftly and lightly, a most desirable feature in the class of kitchen utensils to which my invention more particularly pertains.

With the above described object in view, my invention consists in the novel construction, combination and arrangement herein fully described, illustrated and claimed.

Figure 1:
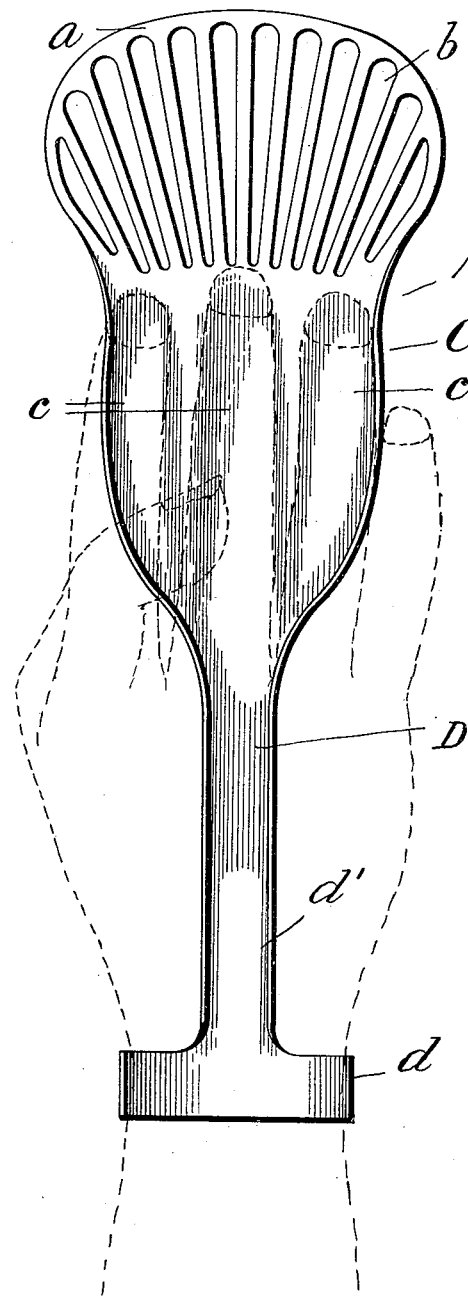
Figure 2:
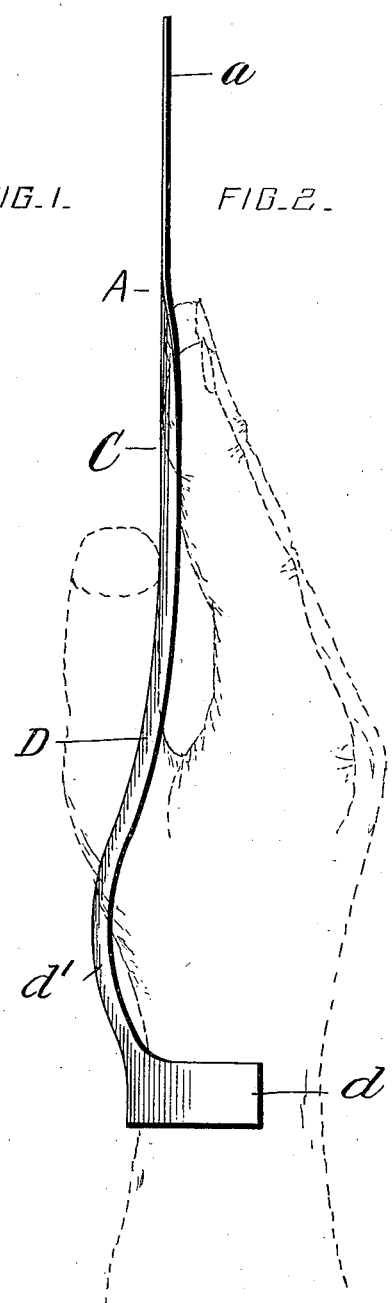

In the accompanying drawings, Figure 1 is a top plan view of a beater or mixer provided with my improvement and showing in dotted lines the hand of a user in operative position. Fig. 2 is a side view of the same.

A represents the main body of a preferred form of beater provided with my invention, which may be constructed of any suitable material, and in any desired shape or size. In the form shown in the drawing, the beater portion $a$ is approximately fan shaped and is provided with a series of quasi-radially disposed longitudinally extending slots or openings $b$ slightly wider at their outer than at their inner extremities.

C represents the portion of the device, which is adapted to be engaged by the hand of the operator in relaxed position, and is preferably of less width than the part B and may be integral therewith. Longitudinally disposed grooves $c$ are provided upon the upper side of the part C to receive the fingers of the hand of the user, and while I have shown only three of these grooves the part C may be widened and a fourth groove added to accommodate the little finger.

The part C is preferably reduced in width near its inner extremity to permit it to be readily engaged upon its under side by the thumb of the operator. Secured to the part C in any desired manner, but preferably integral therewith, is a handle D which may be of the form shown in the drawings and is provided at its end with a transversely extending curved part $d$ adapted to engage the under side of the wrist of the user as clearly illustrated. Between the wrist engaging part $d$ and the part C the handle is provided with a depression $d'$ to accommodate the thicker portion of the hand. It is obvious that the handle may be dispensed with, and the device manipulated by using the part C without that attachment.

The mode of using the device is obvious. The hand of the operator is placed upon the part C, in open position with the fingers lying relaxed and open in the grooves $c$, while the thumb is pressed against the under side of said part. The curved portion $d$ of the handle will naturally engage the wrist and the depression $d'$ the thicker part of the hand, so that in the operation of beating or mixing, there is no necessity for gripping any part of the device, but on the contrary the whole operation is performed with the hand open and relaxed, thus avoiding undue fatigue or strain, as is the case with similar devices now in use.

While I have shown and described my invention as applied to beaters, it obviously may be used with any other device to which it may be applicable.

What I claim and desire to secure by Letters Patent is:—

1. A beater for cake batter and analogous material, provided with a part adapted to be manually engaged by the operator, said part being provided upon one side with means for engaging and maintaining the fingers of the hand in separated extended and relaxed position and adapted to be engaged upon its opposite side by the thumb.

2. A beater for cake batter and analogous material, provided with a part adapted to be manually engaged by the operator, said part being provided upon one side with a plurality of longitudinally extending grooves for engaging the fingers in extended position and adapted to be engaged by the thumb upon its opposite side.

3. A beater for cake batter and analogous material, provided with a part to be manually engaged by the operator, said part being provided upon one side with a plurality of longitudinally extending grooves for engaging the fingers in extended position and adapted to be engaged by the thumb upon its opposite side, and being also provided with an extension having a transversely disposed wrist engaging part, at one end and a depressed portion to receive the thicker portion of the hand.

In testimony whereof I affix my signature, in the presence of two witnesses.

CLAIRE WHITNEY.

Witnesses:
  FREDK. B. NORTON,
  F. J. MCWILLIAMS.

---

Copies of this patent may be obtained for five cents each, by addressing the "Commissioner of Patents, Washington, D. C."